Figures 1, 2:
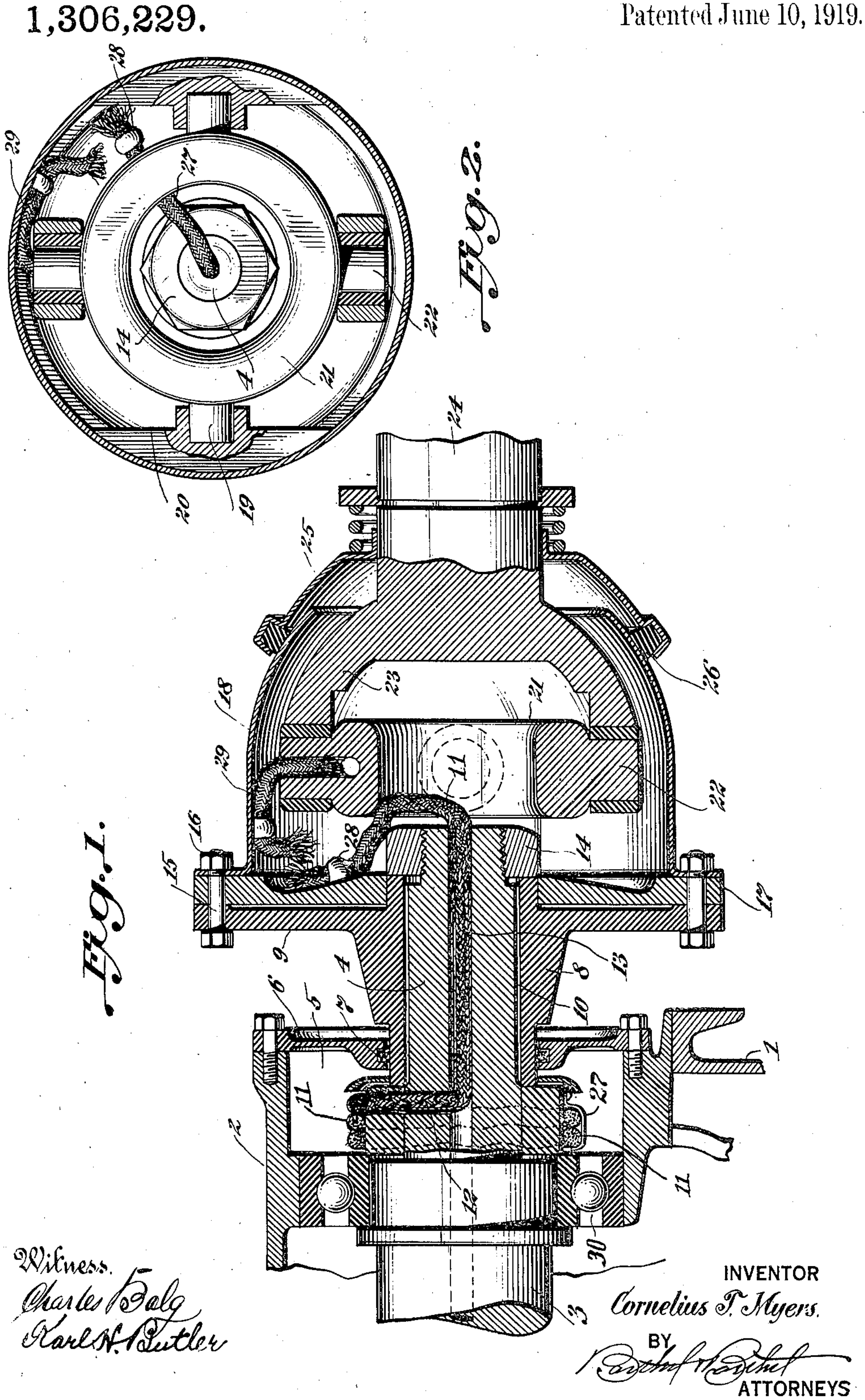

C. T. MYERS.
LUBRICATING MEANS FOR UNIVERSAL JOINTS.
APPLICATION FILED DEC. 7, 1917.

1,306,229. Patented June 10, 1919.

Witness.
Charles Balg
Karl H. Butler

INVENTOR
Cornelius T. Myers.
BY
[signature]
ATTORNEYS

UNITED STATES PATENT OFFICE.

CORNELIUS T. MYERS, OF DETROIT, MICHIGAN.

LUBRICATING MEANS FOR UNIVERSAL JOINTS.

1,306,229. Specification of Letters Patent. Patented June 10, 1919.

Application filed December 7, 1917. Serial No. 205,929.

*To all whom it may concern:*

Be it known that I, CORNELIUS T. MYERS, a citizen of the United States of America, residing at Detroit, in the county of Wayne and State of Michigan, have invented certain new and useful Improvements in Lubricating Means for Universal Joints, of which the following is a specification, reference being had therein to the accompanying drawings.

This invention relates to lubricating means for universal joints and similar power transmitting devices, and the primary object of my invention is to utilize the well known principle of capillary attraction for conducting a lubricant to the interior of a universal joint and to such bearings or movable parts thereof that may require lubrication.

A further object of my invention is to conduct a lubricant to a universal joint and provide means within the joint for conducting the lubricant from walls thereof to the trunnions, bearings or other movable parts of the universal joint.

The above and other objects are attained by a mechanical construction that will be hereinafter specifically described and then claimed, and reference will now be had to the drawing, wherein there is illustrated a preferred embodiment of my invention in connection with a conventional form of universal joint, but it is to be understood that the type of joint to be hereinafter referred to is merely an example of a joint commonly used and embodying driven and drive members articulated for universal movement, and it is obvious my invention may be used in connection with any parts to be lubricated.

In the drawing,

Figure 1 is a longitudinal sectional view of a universal joint provided with my improved lubricating means, and Fig. 2 is a cross sectional view of the same.

In the drawing, the reference numeral 1 denotes a portion of a gear casing, bearing or support that may be part of a motor driven vehicle, as a commercial or pleasure automobile. On the support 1 is a bearing 2 for a drive member 3 having a reduced end or spindle 4 and said bearing provides a chamber 5 closed by a plate 6 and a dust ring 7 surrounding the hub portion 8 of a head 9. The chamber 5 serves as a lubricant reservoir or receptacle and may receive lubricant from any suitable source. The hub 8 is fixed relative to the spindle 4, which has longitudinal driving splines 10 and in the chamber 5 is a wick or conductor 11. This wick or conductor is wound around and fastened to the shaft 4 and extends into a radially disposed port 12 and through a longitudinal bore 13 in the spindle 4, and fastened to the flange 17 inside the casing 18 with a clip 28, this clip being at a greater distance from the center of the shaft 4 than the other end of the wick which is clipped to the shaft at 27.

The hub 8 of the head 9 is held relative to the spindle 4 of the drive member 3 by a nut or other holdfast device 14 on the end of the spindle 4, and connected to the head 9 by bolts 15 and nuts 16 or other fastening means is a joint member 17 and a casing 18. The joint member 17 is ordinarily considered as a socket member and has bearings 20 with the trunnions 19 of a coupling ring 21 and said coupling ring has trunnions 22 in suitable bearings carried by the fork or yoke 23 of a driven member 24, said fork or yoke often being known as the ball member of a joint.

On the driven member 24 is a spring pressed cap 25 having a dust ring 26 engaging the casing 18, said casing and said cap excluding dust and foreign matter from the universal joint and at the same time providing an inclosure or compartment that may receive a lubricating oil.

The lubricating oil will be conducted to said joint member 17 and to the inner walls of the casing 18 by means of the wick 11. Suitably connected to the inner wall of the casing 18 is a wick 29 and this wick represents one of many that may or may not be employed for conducting the lubricating oil to the joints or bearings between the joint members. As the centrifugal force of the universal joint will cause lubricating oil to impinge against the inner walls of the casing 18, the wicks 29 will conduct the oil from these walls to the parts requiring lubrication.

The operation of the device may be intermittent. For instance, the lubricant is absorbed by the wick from the reservoir when the speed of the shaft is low enough to enable capillary attraction to overcome the centrifugal force in that part of the wick that is wrapped around the shaft and extends to its axis. When the joint is in operation the centrifugal force and surface tension will draw the oil from that part of the wick within the casing and feed the trunnion bearings, it being only necessary to provide a wick of sufficient length to hold in suspension a sufficient quantity of lubricant to feed the trunnion bearings during high speed rotation of the rotary member.

The bore 13 may be extended through the axis of the shaft to the opposite side of the annular ball bearing 30 in the housing 2 as shown in dotted lines, Fig. 1, so as to take oil directly from the gear case instead of the chamber 5.

I am aware that the use of lubricating oil in the casing or universal joint housing to lubricate parts therein has been attempted, but the centrifugal force produced by the revolving parts has held the oil against the walls of the casing or housing and not at such parts or points where lubrication is required.

Further the oil has to be supplied in a small quantity and frequently renewed, as it escapes from the joint more quickly than grease.

As a result the almost universal lubricant is dope or grease which is not a really satisfactory lubricant because it carries dirt and has much inert matter in its makeup.

My device provides a small but continuous supply of clean oil and is not open to the objection of allowing dirt to enter the casing when filling or when feeding for the wick acts as a filter.

With my arrangement of parts the lubricating oils are positively conducted to the trunnions or bearings requiring lubrication.

What I claim is:

1. The combination of revoluble driven and drive shafts, an inclosure therefor, and a wick in communication with a suitable supply of lubricant and extending through a passage in one of said shafts into said inclosure to conduct lubricant thereto.

2. The combination of revoluble driven and drive shafts, an inclosure therefor, a wick in communication with a suitable supply of lubricant and extending through a passage in one of said shafts into said inclosure, to conduct lubricant thereto, and other wicks in said inclosure adapted to conduct lubricant to particular parts of said driven and drive members.

3. In a universal joint, driven and drive members articulated for universal movement by joint members, said drive member having a bore therein, a wick adapted to conduct a lubricant through the bore of said member to one of said joint members, and means for further conducting the lubricant to the other joint members.

4. In a universal joint, driven and drive members articulated by joint members for universal movement, a casing inclosing said joint members, a wick adapted to conduct a lubricant to one of said joint members, and a wick connected to the inner side of said casing adapted to further conduct the lubricant to parts of said joint members requiring lubrication.

5. In a universal joint, driven and drive members, the latter including a ported and bored spindle, joint members articulating said driven and drive members for universal movement, means adapted for conducting a lubricating oil to said spindle, and to one of said joint members, and means adapted for further conducting the lubricating oil to parts of the other joint member.

6. The combination of a rotary member and lubricant supplying means in said rotary member having one end disposed to conduct lubricant through said member by capillary attraction, and the other end disposed at an angle to the axis of said rotary member to discharge the lubricant by centrifugal force.

7. The combination of a rotary member having an axial bore, a wick in the bore of said member adapted by capillary attraction to conduct a lubricant through said bore to a point at a greater radial distance from said bore than the other end of said wick whereby the lubricant will be discharged by centrifugal force during the operation of said rotary member.

8. The combination of a rotary member, a wick carried thereby having one end adapted to receive a lubricant by capillary attraction and the opposite end thereof discharge lubricant by the centrifugal force produced by said rotary member, said wick receiving lubricant when said capillary attraction is greater than the centrifugal force of said rotary member, and said wick being of sufficient length to hold in suspension sufficient lubricant for said rotary member when intermittently operated.

In testimony whereof I affix my signature in the presence of two witnesses.

CORNELIUS T. MYERS.

Witnesses:
A. EUGENE PARSONS,
JOHN J. FLYNN.